Nov. 6, 1962 W. D. LUDWIG 3,062,236
DUAL SEAL VALVE
Filed June 17, 1959 5 Sheets-Sheet 1

INVENTOR.
WALTER D. LUDWIG
BY Donnelly, Mentag & Harrington
ATTORNEYS

Nov. 6, 1962  W. D. LUDWIG  3,062,236
DUAL SEAL VALVE
Filed June 17, 1959  5 Sheets-Sheet 2

INVENTOR.
WALTER D. LUDWIG
BY Donnelly, Mentag & Harrington
ATTORNEYS

Nov. 6, 1962 W. D. LUDWIG 3,062,236
DUAL SEAL VALVE
Filed June 17, 1959 5 Sheets-Sheet 3
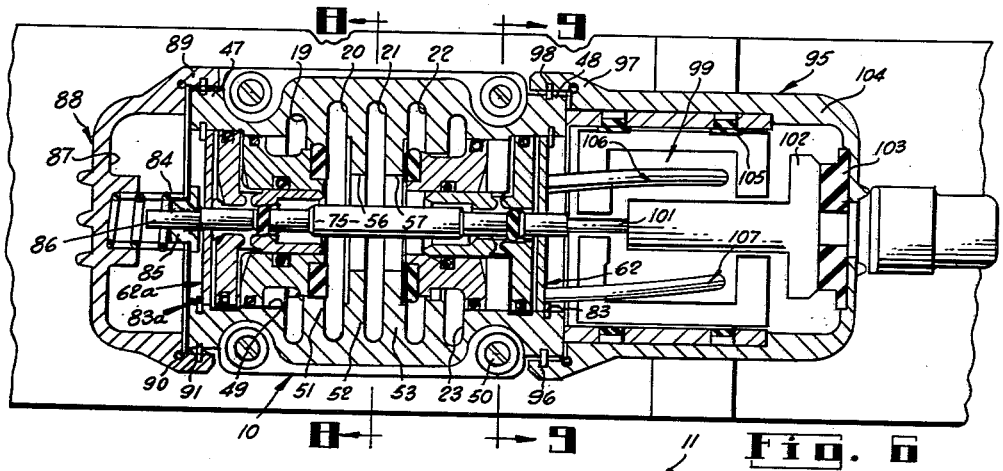
Fig. 6
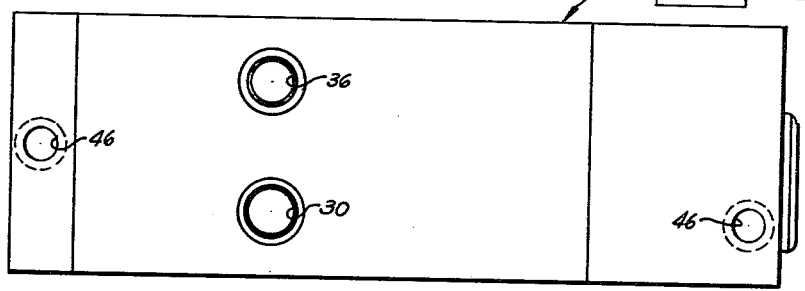
Fig. 7
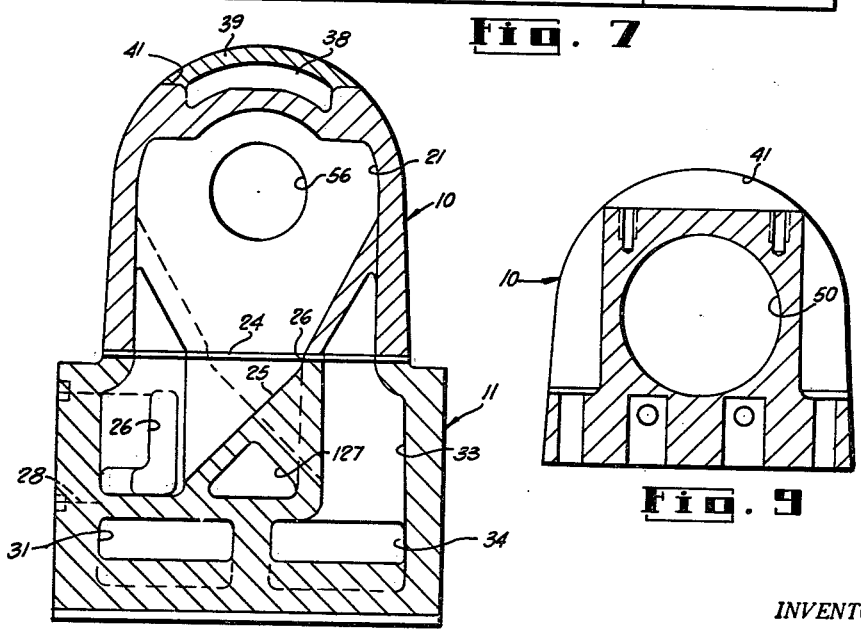
Fig. 8
Fig. 9
INVENTOR.
WALTER D. LUDWIG
BY
Donnelly, Mentag & Harrington
ATTORNEYS

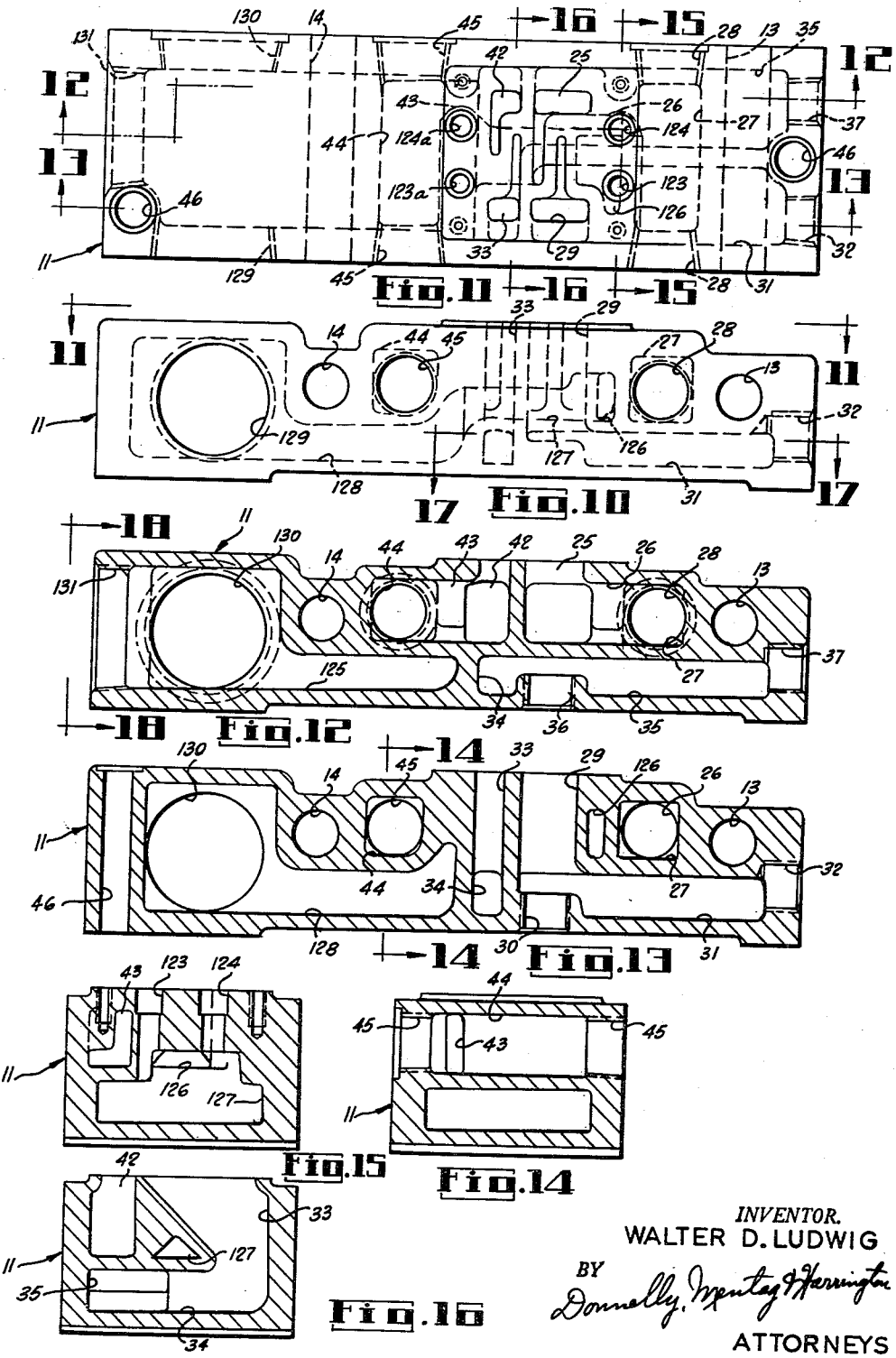

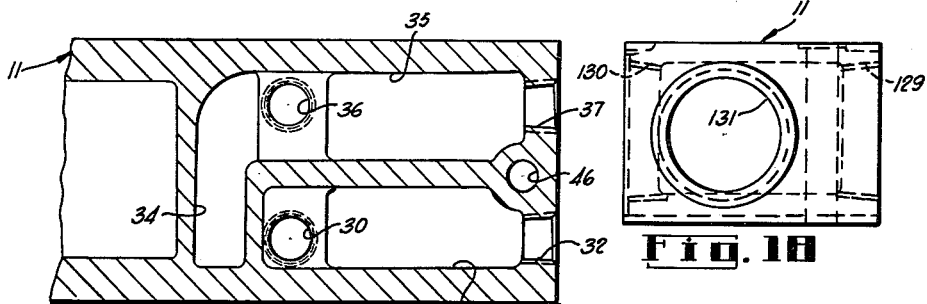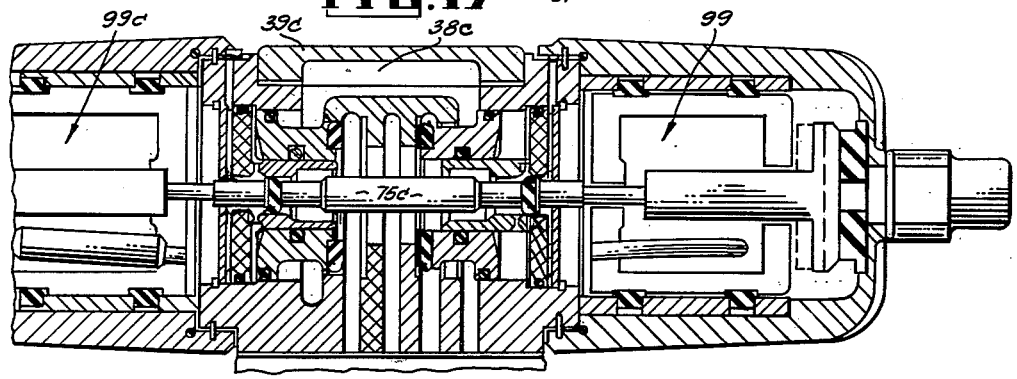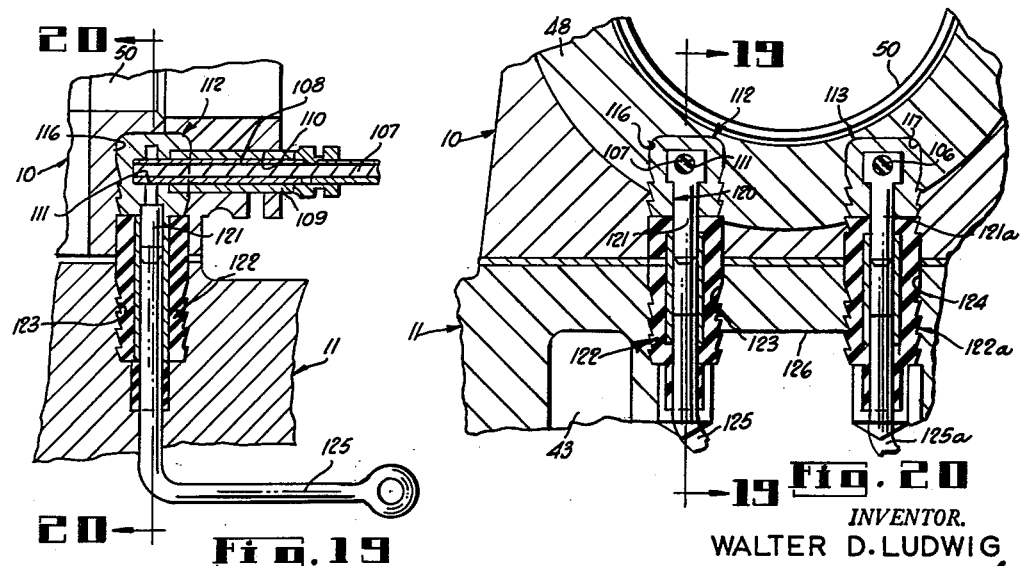

United States Patent Office 3,062,236
Patented Nov. 6, 1962

3,062,236
DUAL SEAL VALVE
Walter D. Ludwig, 3865 W. Lincoln Drive,
Birmingham, Mich.
Filed June 17, 1959, Ser. No. 820,887
8 Claims. (Cl. 137—623)

This invention relates generally to improvements in valves, and, more particularly, to valves especially adapted for continuous high speed operation for controlling a fluid under pressure, as air and the like.

It is an object of this invention to provide a new and improved high speed solenoid actuated air control valve of the pilot controlled type which incorporates an efficient circular-flow design and operates with a short stroke and provides instant response.

It is another object of this invention to provide an improved four-way reversing dual-seal air valve which includes an inner or pilot spool and a pair of opposing, concentrically mounted outer or poppet valves for air flow control purposes, and wherein the pilot spool is adapted to be operated by solenoid, manual, and/or mechanical types of operating means.

It is a further object of this invention to provide a novel four-way reversing dual-seal air valve which may be made to operate with either a single or a double solenoid construction, and wherein the main parts of the valve may be easily and quickly disconnected from each other for servicing purposes.

It is still another object of this invention to provide a valve of the character disclosed which is more efficient in operation, which has a wider range of utility, and which is composed of fewer parts as compared with prior art valves of this type.

It is a still further object of this invention to provide a valve of the character disclosed which is simple and compact in construction, light in weight, and which incorporates a novel add-a-unit manifold base, whereby it is possible to quickly and easily group a plurality of the valves together to form a compact multiple installation.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 6 is a slightly enlarged, partial, horizontal sectional view of the structure illustrated in FIG. 2, taken along the line 6—6 thereof and looking in the direction of the arrows;

FIG. 7 is a bottom plan view of the manifold base structure illustrated in FIG. 2, taken along the line 7—7 thereof and looking in the direction of the arrows;

FIG. 8 is an elevational sectional view of the structure illustrated in FIG. 6, with parts removed, taken along the line 8—8 thereof and looking in the direction of the arrows;

FIG. 9 is an elevational sectional view of the upper structure of the valve as illustrated in FIG. 6, taken along the line 9—9 thereof and looking in the direction of the arrows;

FIG. 10 is a side elevational view of the manifold base structure illustrated in FIG. 1, taken along the line 10—10 thereof and looking in the direction of the arrows;

FIG. 11 is a top plan view of the manifold base structure illustrated in FIG. 10, taken along the line 11—11 thereof and looking in the direction of the arrows;

FIG. 12 is an elevational sectional view of the manifold base structure illustrated in FIG. 11, taken along the line 12—12 thereof and looking in the direction of the arrows;

FIG. 13 is an elevational sectional view of the manifold base structure illustrated in FIG. 11, taken along the line 13—13 thereof and looking in the direction of the arrows;

FIG. 14 is an elevational sectional view of the structure illustrated in FIG. 13, taken along the line 14—14 thereof and looking in the direction of the arrows;

FIG. 15 is an elevational sectional view of the structure illustrated in FIG. 11, taken along the line 15—15 thereof and looking in the direction of the arrows;

FIG. 16 is an elevational sectional view of the structure illustrated in FIG. 11, taken along the line 16—16 thereof and looking in the direction of the arrows;

FIG. 17 is a fragmentary horizontal sectional view of the structure illustrated in FIG. 10, taken along the line 17—17 thereof and looking in the direction of the arrows;

FIG. 18 is an end elevational view of the manifold base structure illustrated in FIG. 12, taken along the line 18—18 thereof and looking in the direction of the arrows;

FIG. 19 is a fragmentary elevational sectional view of the structure illustrated in FIG. 20, taken along the line 19—19 thereof, looking in the direction of the arrows, and showing the dual purpose electrical right angle disconnect means;

FIG. 20 is an elevational sectional view of the structure illustrated in FIG. 19, taken along the line 20—20 thereof and looking in the direction of the arrows;

The valve of the present invention may be provided with one solenoid and a return spring for actuating the pilot or inner valve spool, or it may be provided with two solenoids for actuating the pilot valve spool. FIGS. 1 through 23 illustrate a preferred embodiment of the valve of the present invention and show a single solenoid for actuating the pilot spool in one direction and a return spring for actuating the same in the other direction. FIG. 24 illustrates the preferred embodiment in a slightly modified condition wherein two solenoids are used for moving the pilot spool. The dual-seal four way reversing valve of the present invention is especially adapted for controlling the flow of air under pressure, but it will be understood that the valve may also be used to control other pressure fluids such as a liquid or gas under pressure. The valve of the present invention is adapted to feed and exhaust fluid under pressure alternately and successively from opposite ends of a cylinder which is to be controlled by the valve.

Figures 1, 2, 3:
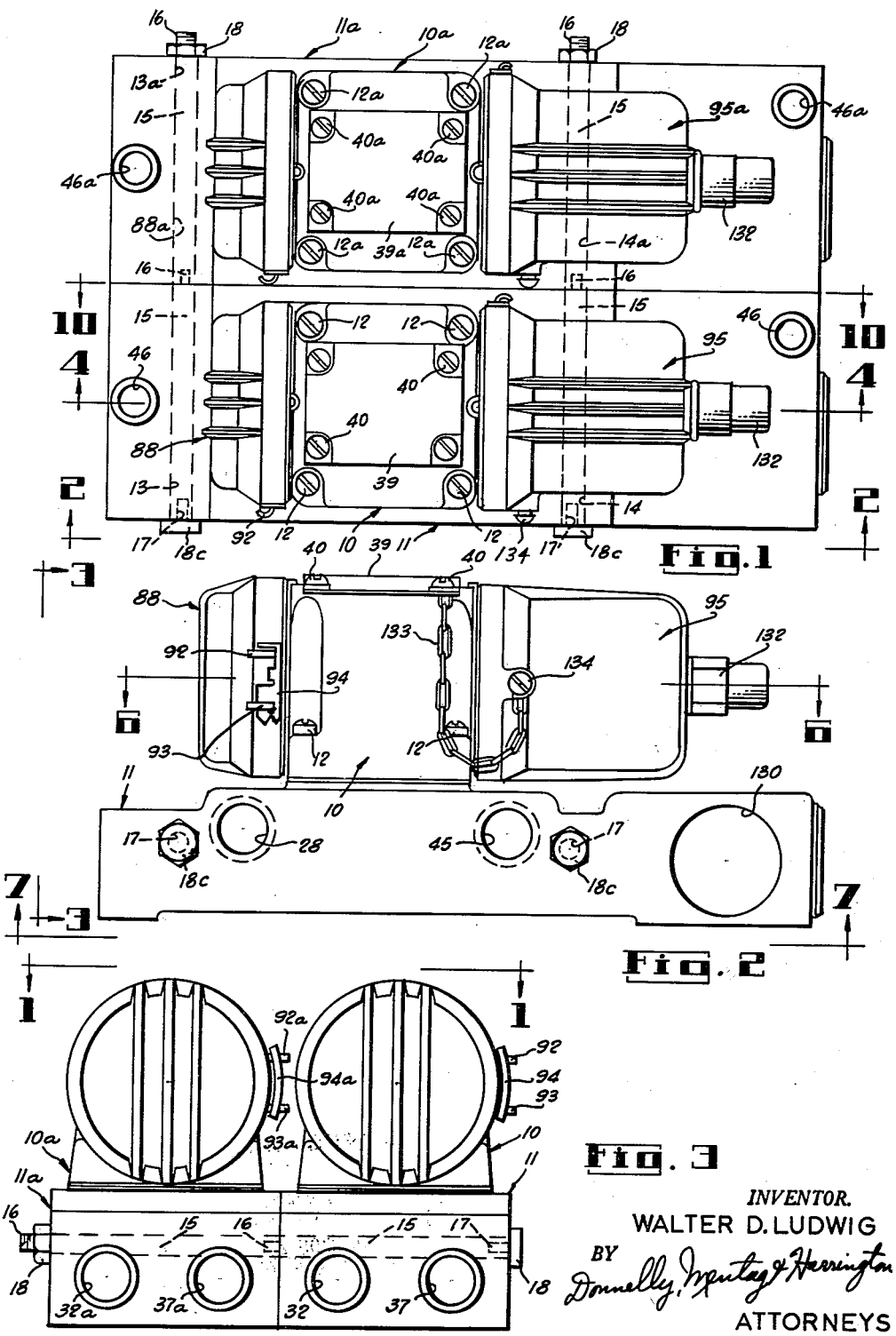
FIG. 1 is a top plan view of a pair of dual-seal air valves employing a single solenoid and made in accordance with the principles of the invention.
FIG. 2 is a side elevational view of the structure illustrated in FIG. 1, taken along the line 2—2 thereof, and looking in the direction of the arrows.
FIG. 3 is an end elevational view of the structure illustrated in FIG. 2, taken along the line 3—3 thereof, and looking in the direction of the arrows.

Referring now to the drawings, and in particular to FIGS. 1, 2 and 3, a pair of valves embodying the invention is shown in a position wherein they are mounted side by side to provide a multiple installation. Both of the valves illustrated in FIGS. 1, 2 and 3 are constructed the same and, accordingly, the similar parts thereof are marked with corresponding numerals followed by the small letter "a." The valve comprises a valve body or casing, generally indicated by the numeral 10, which is adapted to be releasably secured on the base, generally indicated by the numeral 11, by means of a plurality of fillister head or other suitable screws as 12. As shown in FIGS. 1, 2, 10, and 11, the manifold type base 11 is provided with a pair of transverse holes as 13 and 14 for the reception of the sectional connectors 15, which have a male thread at one end as 16 and a female thread as 17. A nut as 18 is adapted to be threaded on the male threaded end 16 and a screw, as 18c, is adapted to be mounted in the female threaded end 17 to secure a pair of bases 11 together. The use of connectors as 15 permits the connecting together of a plurality of connectors 15 and bases 11 in an easy and quick manner so as to form a multiple installation.

Figure 4:
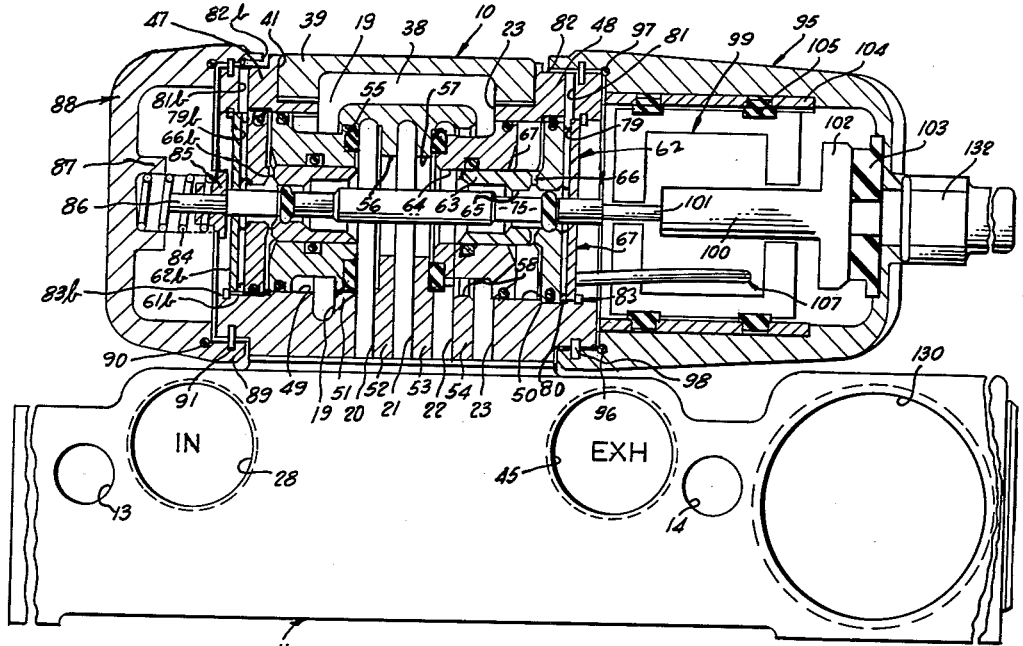
FIG. 4 is an enlarged elevational view, partly in section, of the structure illustrated in FIG. 1, with the upper half thereof being shown in section and taken along the line 4—4 thereof, and, showing the master spool means moved to a first position, to the left as viewed in FIG. 4.

As shown in FIGS. 4 and 6, the valve body 10 is provided with a plurality of annular chambers 19, 20, 21, 22 and 23. As best seen in FIGS. 4 and 8, the annular chamber 21 comprises the main pressure fluid supply chamber and is provided on the lower end thereof with an inlet port 24. The inlet port 24 communicates with the passage 25 formed in the manifold base 11 and this passage 25 is substantially L-shaped at the upper end thereof, as shown in FIG. 11. As shown in FIGS. 8 and 11, the passage 25 extends longitudinally of the base 11 toward the right end thereof and narrows as at the point 26, after which it communicates with the transverse or cross passage 27. As shown in FIG. 11, the inlet passage 27 communicates with an inlet port as 28 at each end thereof. It will be understood, that when the valve is used singly, one of the ports 28 will be closed by a suitable plug while the other port 28 will be connected to a suitable source of high pressure fluid, such as air.

The chamber 20 may be termed a first pressure fluid feed or transfer chamber and, as shown in FIGS. 4 and 11, is provided with a T-shaped inlet port which communicates with the vertical passage 29 in the manifold base 11. The passage 29 has a T-shaped entrance at the upper end thereof as shown in FIG. 11 and communicates at the lower end thereof with a first port 30 which is adapted to be connected to one end of a cylinder or fluid motor which is to be controlled by the valve. As shown in FIG. 13, the passage 29 is further connected to a second port 32 by means of the passage 31. The port 32 being adapted to function for the same purpose as port 30 when the latter is plugged and not used.

The chamber 22 may be termed a second pressure fluid feed or transfer chamber and, as shown in FIGS. 4 and 11, is provided with an L-shaped inlet port on the lower end thereof which communicates with the vertical passage 33 in the manifold base 11. The passage 33 has an L-shaped entrance at the upper end thereof as shown in FIG. 11 and communicates at the lower end thereof with a transverse passage 34 which in turn communicates with the longitudinally extended passage 35. The passage 35, as shown in FIG. 13, communicates with the port 36 in the bottom of the base 11 and the port 37 in the right end of the base 11. The ports 36 and 37 may be selectively used to communicate the chamber 22 with the other end of the cylinder or fluid motor to be controlled.

As shown in FIGS. 4, 6 and 8, the chambers 19 and 23 may be termed the first and second exhaust chambers, respectively. The chambers 19 and 23 are connected at the upper ends thereof by means of the longitudinally extending interconnecting passage 38 which is formed in the upper end of the body 10. The passage 38 is enclosed on the upper side thereof by means of the square, arcuately shaped cover 39 which is fixed in place in the opening 41 in the body 10 by means of the bolts 40. As shown in FIGS. 4, 11 and 12, the lower end of the exhaust chamber 23 is L-shaped and communicates with the passage 42 in the manifold base 11. The passage 42 is substantially L-shaped at the upper entrance end thereof and it extends longitudinally to the left of the base 11, as shown in FIGS. 11 and 12 to the point 43 where it narrows and then finally communicates with the transverse or cross passage 44. As shown in FIG. 11, the cross passage 44 communicates with an exhaust port as 45 at each end thereof. The manifold base 11 is provided with suitable bolt holes as 46 for the reception of mounting bolts.

Figure 5:
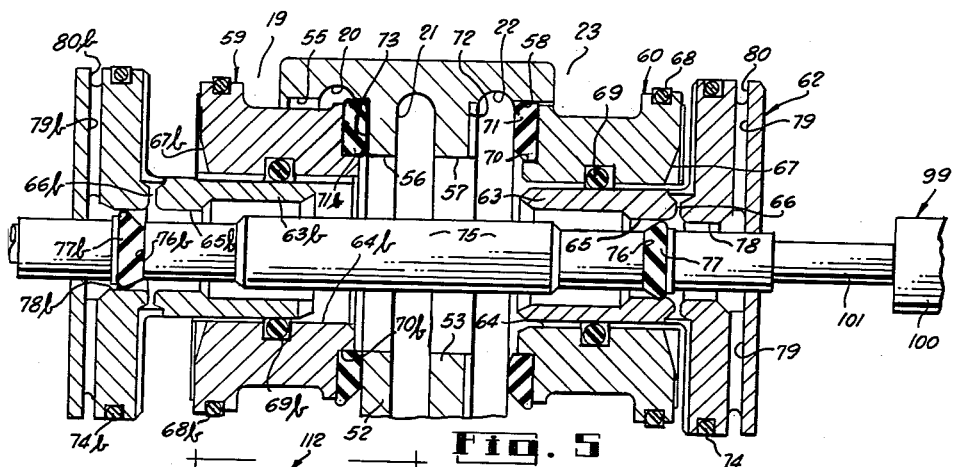
FIG. 5 is a fragmentary central elevational sectional view of the dual-seal valve shown in FIG. 4 and showing the master spool means moved to a second position, that is, to the right as viewed in FIGS. 4 and 5.
Figures 21, 22:
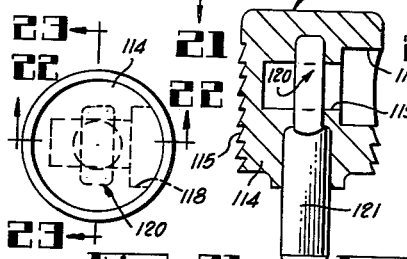
FIG. 21 is a top plan view of the combined male and female right angle disconnect body shown in FIG. 22, taken along the line 21—21 thereof and looking in the direction of the arrows.
FIG. 22 is an elevational sectional view of the structure illustrated in FIG. 21, taken substantially along the line 22—22 thereof and looking in the direction of the arrows.
Figure 23:
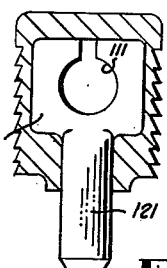
FIG. 23 is an elevational sectional view of the structure illustrated in FIG. 21, taken along the line 23—23 thereof and looking in the direction of the arrows; and, FIG. 24 is a fragmentary elevational sectional view similar to FIG. 4.

As shown in FIGS. 4 and 6, the valve body 10 is provided with the reduced circular ends 47 and 48, which are provided with the axial bores 49 and 50, respectively. As best seen in FIGS. 4, 5 and 6, the chamber walls 51, 52, 53 and 54 are provided with the axial bores therethrough as 55, 56, 57, and 58, respectively, so as to form passageways between the respective adjacent annular chambers 19, 20, 21, 22 and 23.

As shown in FIGS. 4, 5 and 6, the valve includes a master spool or outer spool means which comprises the two separate master sleeves or spools 59 and 60, which are adapted to be slidably mounted in the body bores 49 and 50, respectively. The master spools 59 and 60 are similarly constructed, and, accordingly, the structure on the right end, as shown in these views, will be described with certain reference numerals and the similar structure on the left end will be marked with corresponding reference numerals followed by the small letter "b." The outer ends of the body bores 49 and 50 are enlarged as indicated by the numeral 61, to provide a step in which is seated an annular retainer bushing 62 which functions as a cylinder head. Integrally formed on the inner side of the retainer 62 is the hollow guide member or sleeve 62 which is adapted to slidably extend into the end of the axial bore 64 of the master or outer spool 60.

Air under pressure is admitted into the annular space between the end of the master spool 60 and the retainer 62 by the following means. The master spool 60 and the sleeve 63 are in communication with the pressure fluid supply chamber 21 by means of the bore 57 and chamber 22. Pressure fluid is thus admitted at all times into the bore 65 in the retainer sleeve 63 and is allowed to pass through radial ports or passageways 66 formed through the retainer sleeve 63. The ports 66 convey the fluid under pressure into the space behind the end of the master spool 60 for moving the master spool, as more fully described hereinafter. The outer end of the master spool bore 64 is counter-bored as indicated by the numeral 67 to provide an initial area for the fluid to enter.

The master spool 60 is provided with a suitable sealing means, as the O ring 68 around the outer end thereof, for sealing engagement with the bore 50. A similar O ring sealing means 69 is mounted in the bore 64 for sealing engagement with the sleeve 63. As shown in FIGS. 4, 5 and 6, master spool 60 is provided on its inner end face with an annular shoulder or step 70 around the periphery thereof in which is fixedly mounted a suitable moulded seal as 71. When the master spool 60 is moved to the right to the position shown in FIG. 5, the outer periphery of the sealing ring 71 sealingly engages the bore 58 in the wall 54 to seal off the chamber 22 from the exhaust chamber 23. When the master spool 60 is moved to the left as shown in FIG. 4, the front side face of the sealing ring 71 sealingly engages the annular recess or seat 72 formed around the outer edge of the bore 57 in wall 53. The sealing ring 71a on master spool 59 functions similarly with the bore 55 and the seat 73 on the wall 52. An O ring type sealing means 74 is also provided around the outer periphery of the retainer 62.

As shown in FIGS. 4, 5 and 6, the valve is provided with a pilot stem or inner spool, generally indicated by the numeral 75, which is mounted within the bore 65 of the retainer bushing 62. The inner spool 75 extends longitudinally through the valve body 10. The pilot spool 75 is provided at each end thereof with a groove as 76 in which is mounted a moulded seal as 77 which is adapted to sealingly engage the bore 65 in the retaining sleeve 63 so as to regulate the flow of pressure fluid through the ports 66 depending on the relative position of the pilot valve. The bore 65 in the retainer sleeve 63 is continued outwardly into the retainer 62 as indicated by the numeral 78. The outer end of the bore 78 communicates with a plurality of radially spaced apart passageways 79 which communicate at their outer ends with the peripheral groove 80 on the periphery of the retainer 62. The groove 80 in turn communicates with the passageways 81 and clearance space 82 to the atmosphere. The retainer bushing 62 is releasably secured in place in the body 10 by means of a retainer snap ring as 83. It will be seen that when the moulded seal 77 on the pilot valve 75 is disposed inwardly of the ports 66, the space behind the end of the master spools will be exhausted to the atmosphere through the bore 78, the passageways 79, 80 and 81 and clearance space 82.

As shown in FIGS. 4 and 6, the pilot spool 75 is adapted to be normally biased to the right by means of the return spring 84 which has one end abutting a shoulder on the retainer ring 85 which is seated on the reduced left end 86 of the pilot spool and against a shoulder thereon. The other end of the spring 84 is seated within the integrally formed hub 87 on the inner end face of the spring cover 88. The spring cover 88 is provided with a reduced annular lip as 89 which is adapted to be seated on the reduced shoulder or end 47 of the valve body 10. A suitable O-ring 90 is mounted between the cover 88 and the valve body end 47. The cover 88 is releasably secured on the body end 47 by means of the retaining ring 91 which is adapted to be partially mounted within grooves formed in the cover and the valve body end. As shown in FIGS. 2 and 3, the retaining ring 91 is provided with the finger engaging arms 92 and 93. In order to release the retaining ring 91 from the groove in the cap or cover 88, the safety lock 94 is moved to the right as viewed in FIG. 2 to permit the arms 92 and 93 to be squeezed together. This action releases the cover 88 which may then be removed.

As best seen in FIGS. 4 and 6, the right end of the valve body 10 is enclosed by the end cover 95 which is provided with the inner and peripheral lip 96 which is adapted to seat on the reduced end 48 of the valve body 10 in the same manner as the end cover 88. A sealing ring 97 is provided between the end cover 95 and the valve body 10. A retaining clip 98 is provided to retain the end cover 95 on the body 10, and this snap ring 98 is similar in structure and function to the snap ring 91.

The pilot valve 75 is adapted to be moved to the left as viewed in FIG. 4 by means of a conventional solenoid, generally indicated by the numeral 99. As disposed, the solenoid 99 is adapted to function as a push type solenoid to push the pilot valve 75 to the left as viewed in FIG. 4, when the solenoid is energized. The solenoid 99 includes the usual armature rod 100 which is adapted to abut the right end of the reduced end 101 of the pilot valve 75. The outer end of the armature rod 100 is provided with the integral enlarged stop 102 which is adapted to abut the rubber stop pad or cushion 103 when the solenoid is de-energized. The stop pad 103 is fixedly secured in the outer end of the cover 95 by any suitable means. The solenoid 99 is held in the insert member 104 by means of the rubber snubbers or solenoid mounting members 105.

The solenoid lead wires 106 and 107, shown in FIG. 6, are adapted to be connected to a novel right angle disconnect means as shown in FIGS. 15, 19, 20, 21, 22, and 23. As illustrated in FIG. 19, each of these wires are provided at their ends with a metal prong as 108 which is partially covered by the plastic sleeve 109. The sleeve 109 is adapted to slidably fit into the hole 110 formed in the end of the valve body 10. The outer end of the prong 108 is uncovered and slips into the hole 111 in the right angle male dual disconnect member generally indicated by the numeral 112. A similar disconnect member 113 is provided for the other lead wire 106. The members 112 and 113 are made from a plastic material or other suitable non-conductive material and are each provided with a body portion as 114 having a serrated outer surface as 115. The members 112 and 113 are press fitted into the holes 116 and 117 in the valve body 10. The plastic sleeve 109 fits into the enlarged hole 118 in the dual connector body 114 and the prong 108 fits into the hole 111 in the male prong 120 which is made from a suitable conductive metal and has a square head. The male prong 120 has the portion 121 which is adapted to be slipped into a mating female connector as 122 which is mounted in a vertical hole as 123 in the base 11. The other connector 122a is mounted in a similar hole as 124 in the base 11. The female connectors 122 have suitably connected thereto a lead wire as 125 and 125a for connection to a source of power. The aforedescribed right angle electrical disconnect structure provides a disconnect means which is self-retaining and readily replaceable.

As shown in FIGS. 11 through 16 and 20, the lead wires 125 extend downwardly into a passage 126 and then pass to the left end of the manifold base 11 through the passages 127 and 128. The user has the option of having the wires come out of either the conduit openings 129, 130 or 131, as desired. It will be seen that the aforementioned right angle electrical disconnect structure provides means whereby the solenoid 99 or the entire superstructure may be quickly and easily removed from the body or base respectively. The base 10 is provided with the extra holes 123a and 124a in case it is used with a double-solenoid valve to provide for the quick mounting of the aforedescribed right angle disconnect means on both ends of the valve.

In operation, the master spools 59 and 60, and the pilot spool 75 would be in the initial positions as shown in FIG. 4 before the solenoid 99 is energized. Fluid under pressure would pass through the supply chamber 21 and through the sleeve bore 65 and the ports 66 and into the space behind the master spool 60. At the same time the fluid under pressure would urge the master spool 59 to the left to the position shown in FIG. 4. In the position of FIG. 4, it will be seen that the inlet ports would be connected by means of the main supply chamber 21 and the bore 56 to the first transfer or feed chamber 20 so as to feed fluid under pressure out through the port 32 to one end of a cylinder or fluid motor to be supplied with pressure fluid. The other end of the cylinder would be exhausted through the port 37 and into the second transfer chamber 22. The chamber 22 is in communication with the exhaust chamber 23 by means of the sealing ring 71 being moved inwardly against the seat 72 on wall 53. The sealing ring 71a is simultaneously sealing on its outer edge or periphery in the bore 55 to separate the first transfer chamber 20 from the exhaust chamber 19.

When the solenoid 99 is energized, the armature 100 will be moved to the left as viewed in FIG. 4, whereby the pilot valve 75 will be moved to the left against the pressure of spring 84. The pilot spool 75 will be moved to the position shown in FIG. 5 and air under pressure will be admitted to the left end of the main or master spool 59 so as to move it to the right position shown in FIG. 5. The space behind the master spool 60 will be exhausted to the atmosphere through the passageway 81 and clearance space 82 in the valve body as described hereinbefore. The fluid under pressure acting against the inner face of spool 60 will force it to the right since the sealing member 77 has stopped the flow of air through the bore 65. When the valve is in the position shown in FIG. 5, fluid under pressure will flow from the supply chamber 21 through the bore 57 and into the second transfer chamber 22. The pressure fluid will then flow out the port 37 and to the second end of the cylinder being controlled. The first end of the cylinder being controlled will be exhausted through the port 32 and into the chamber 19, and thence through the passage 38 to chamber 23 and out port 45 to the atmosphere. It will be seen that the valve of the present invention provides a structure wherein the sealing members 77 carry out a dual-sealing function, and wherein the master spools are separate but are constructed alike, as twins, and operate as poppet valves. It will also be seen that the construction of the chambers 19 through 23 provides a circular path for the fluid.

FIGS. 1, 2 and 3, show a conventional manual solenoid operator 132 mounted on the cover 95 to permit manual operation of the solenoid 99, if desired. As shown in FIGS. 2 and 3, the solenoid cover 95 is provided with a safety chain 133 having one end thereof secured to the cover 95 by means of the screw 134 and the other end thereof secured to the valve body 10 by means of the screw 40. The spring cover 88 may also be provided with a similar safety chain, if desired.

FIG. 24 illustrates a slightly modified valve in which the spring 84 has been replaced with a second solenoid generally indicated by the numeral 99c. The solenoid 99c is constructed the same as the first solenoid 99 and the corresponding parts are marked with similar reference numerals followed by the small letter "c." The operation of the valve of FIG. 24 would be the same as the embodiment having the return spring 84 with the second solenoid 99c carrying out the function of the spring 84.

It will be seen that the master spools 59 and 60 co-act with the pilot spool 75 to provide a three-way valve at each end of the valve. It will also be seen, that the novel manifold base 11 permits the quick and easy ganging of the valves to form a multiple installation which is compact and light in weight.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:
1. A valve construction of the class described comprising a main supply chamber; a port for admitting fluid under pressure to said supply chamber; a first transfer chamber on one side of said supply chamber and a second transfer chamber on the other side of said supply chamber; ports for connecting said transfer chambers respectively to opposite ends of a work cylinder to be controlled by the valve; a first exhaust chamber on the outer side of said first transfer chamber; a second exhaust chamber on the outer side of said second transfer chamber; an outlet port for connecting said exhaust chambers to the atmosphere; outer spool means adapted to connect said first transfer chamber to said main supply chamber when the outer spool means is in a first position, and, to connect said second transfer chamber to second exhaust chamber when the outer spool means is in said first position; said outer spool means being adapted to connect said second transfer chamber to said main supply chamber when the outer spool means is in a second position, and to connect said first transfer chamber to said first exhaust chamber when the outer spool means is in said second position; an inner spool operatively mounted axially within said outer spool means; fluid passageways connecting said main supply chamber to each end of said outer spool means for conducting pressure fluid against a selective end of said outer spool means for shifting said outer spool means to said first and second positions; said inner spool being adapted to control the flow of pressure fluid to the ends of said outer spool means; means for moving said inner spool to control the movement of said outer spool means; passageway means for exhausting the pressure fluid from one end of the outer spool means when the other end thereof is subjected to pressure fluid; said outer spool means comprising a pair of oppositely disposed separate outer spools; and, each of said spools being provided with a sealing member adapted to perform a peripheral sealing function when the outer spool is in the first position and to perform an end face sealing function when the spool is in the second position.

2. The structure as defined in claim 1, wherein; the ports leading into each of the chambers are disposed on the lower side of the chambers to provide for circular fluid flow through the chambers.

3. The structure as defined in claim 1, wherein: the means for moving said inner spool comprises a solenoid operatively engaged with one end of said inner spool for moving it in one direction and a return spring connected to the other end of said inner spool for moving it in the other direction.

4. The structure as defined in claim 1, wherein: the means for moving said inner spool comprises a first solenoid operatively engaged with one end of said inner spool for moving it in one direction and a second solenoid operatively engaged with the other end of said inner spool for moving it in the other direction.

5. The structure as defined in claim 1, wherein: the means for moving said inner spool includes means adapted for manual operation of said inner spool.

6. The structure as defined in claim 1, wherein: the valve is provided with an electrical disconnect means, whereby, the solenoid or the valve body may be quickly detached from the other valve structure for service purposes.

7. A valve construction of the class described comprising: a body; a main supply chamber centrally located in said body; a port for admitting fluid under pressure to said supply chamber; a pair of transfer chambers located adjacent to and in communication with said inlet chamber in said body; a pair of ports for transmitting fluid to or from said transfer chambers; a pair of exhaust chambers located adjacent to and in communication with said transfer chambers in said body; a chamber connecting said exhaust chambers; an exhaust port connected to said connecting chamber to exhaust fluid from said exhaust chambers to the exterior of the body; an annular chamber in each end of said body; a pair of exhaust ports to exhaust fluid from said annular chambers to the exterior of the body; a sleeve with an enlarged outer end and a valve located on the inner end slidably mounted in each of said annular chambers for connecting said main supply chamber to a first one of said transfer chambers and the other transfer chamber to a first one of said pair of exhaust chambers when these sleeves are moved to a first position, and for connecting said main supply chamber to the other of said transfer chambers and the other of said exhaust chambers to the second transfer chamber when these sleeves are moved to a second position; said sleeves being spaced apart to maintain constant communication of the interiors thereof with said main supply chamber; a retainer positioned in each of said annular end chambers and enclosing the outer ends thereof; each of said retainers having a hollow portion thereon slidably engaging the interior surface of the sleeve in each annular chamber;

each of said hollow portions having radial ports therethrough arranged to provide communication thereof with the adjacent annular end chamber; a stem with spaced apart pilot valves formed thereon; said stem slidably extending through said sleeves, said retainers, and said annular end chambers; external means for actuating said stem to cause said pilot valves to cooperate with the radial ports in each of said retainer hollow portions to admit and exhaust the fluid under pressure alternately to and from each annular chamber to move said sleeves between said first and second positions; and, exhaust passageways formed in each retainer and in register with said second pair of exhaust ports in said body and communicable with the adjacent annular chamber when the pilot radial ports in each retainer are closed by the respective pilot valve.

8. The structure as defined in claim 7, wherein: each of the valves on said sleeves are provided with a sealing member adapted to perform a peripheral sealing function when the sleeve is in the first position, and to perform an end face sealing function when the sleeve is in the second position.

References Cited in the file of this patent

UNITED STATES PATENTS

| | | |
|---|---|---|
| 2,526,709 | Tait | Oct. 24, 1950 |
| 2,600,348 | Walthers | June 10, 1952 |
| 2,824,574 | Place | Feb. 25, 1958 |

FOREIGN PATENTS

| | | |
|---|---|---|
| 1,047,556 | Germany | Dec. 24, 1958 |